(12) United States Patent
Dietrich

(10) Patent No.: US 7,097,478 B2
(45) Date of Patent: Aug. 29, 2006

(54) ELECTRIC CONNECTING DEVICE

(75) Inventor: Andreas Dietrich, Guldental (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/512,298

(22) PCT Filed: Apr. 9, 2003

(86) PCT No.: PCT/DE03/01159

§ 371 (c)(1),
(2), (4) Date: Jun. 3, 2005

(87) PCT Pub. No.: WO03/092126

PCT Pub. Date: Nov. 6, 2003

(65) Prior Publication Data

US 2005/0227521 A1    Oct. 13, 2005

(30) Foreign Application Priority Data

Apr. 24, 2002 (DE) .............................. 102 18 391
Jun. 15, 2002 (DE) .............................. 102 26 806

(51) Int. Cl.
*H01R 3/00* (2006.01)
(52) U.S. Cl. .................................................. 439/164
(58) Field of Classification Search ................ 439/164, 439/15, 14, 163
See application file for complete search history.

(56) References Cited

U.S. PATENT DOCUMENTS 5,409,389 A * 4/1995 Shibata et al. ............... 439/164
5,971,781 A * 10/1999 Lagier ......................... 439/164

\* cited by examiner

*Primary Examiner*—Phuong Dinh
(74) *Attorney, Agent, or Firm*—David P. Wood

(57) ABSTRACT

The invention relates to an electric connecting device, especially for arrangement between a steering wheel and a steering column switch module of a motor vehicle, comprising a stationary housing part and a rotationable housing part which respectively include a connecting unit and enclose at least one spiral-shaped wound-up, flexible electric conductor whose respective end is connected to the connecting unit and which is guided in a reverse-direction loop inside the housing. The conductor is associated with a forced guidance element in a positive fit, engaging the peripheral side of the conductor and resulting in a defined winding or unwinding of the conductor during a rotational movement of the rotationable housing part. The forced guidance element comprises a toothing that engages into the respective recesses in the conductor and may be assigned to the rotatable housing part, the stationary housing part, or both.

10 Claims, 2 Drawing Sheets

ELECTRIC CONNECTING DEVICE

CROSS-REFERENCE TO RELATED APPLICATIONS

This application claims benefit of priority from PCT application number PCT/DE03/01159, which was filed Apr. 9, 2003; German patent application number 102 18 391.0, which was filed Apr. 24, 2002; and German patent application number 102 26 806.1, which was filed Jun. 15, 2002.

STATEMENT REGARDING FEDERALLY SSPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISK

Not Applicable

BACKGROUND OF THE INVENTION

1. Field of the Invention

The invention pertains to an electric connecting device, especially for arrangement between a steering wheel and a steering column switch module of a motor vehicle, comprising a stationary housing part and a rotatable housing part, which respectively include a connecting unit and enclose at least one spiral-shaped wound up flexible electric conductor whose end is connected to the connecting unit and which is guided in a reverse-direction loop inside the housing.

2. Description of Related Art

Connecting devices of this type are used, in particular, for producing an electrical connection between a power source and a gas-operated impact protection device of motor vehicles that is arranged in the steering wheel. In this case, a conductor arranged between the stationary housing part and the rotatable housing part is of such length that it can follow approximately three revolutions of the steering wheel in both directions. The flexible conductor widens outwardly when the steering wheel is turned in one direction from a central position until it contacts the stationary housing part and contents inwardly when the steering wheel is turned in the other direction until it contacts the rotatable housing part. This uncontrolled widening and contracting of the conductor frequently leads to malfunctions.

BRIEF SUMMARY OF THE INVENTION

The invention is based on the objective of developing an electric connecting device of the initially described type that always operates reliably when the rotational housing part is turned.

According to the invention, this objective is realized in that a forced guidance is assigned to the conductor in a positive fit wherein the forced guidance engages on the periphery of the conductor and causes the conductor to unwind and rewind in a defined fashion when the rotatable housing part is turned.

During this rotational movement, the conductor follows the forced guidance such that the conductor is wound and unwound in a controlled fashion when the rotatable housing part is turned. In addition, the forced guidance prevents the conductor from rubbing on the housing parts such that the noise produced by the conductor can be reduced.

In order to ensure a secure retention and guidance of the conductor, the forced guidance according to one embodiment of the invention comprises a toothing that is assigned to the rotatable housing part and engages into respective recesses arranged in the conductor. The forced guidance preferably also comprises a toothing that is assigned to the stationary housing part. The elasticity and prestress of the conductor that is guided inside the housing in the form of a reverse-direction loop cause the conductor to permanently adjoin the rotatable and stationary housing parts. This ensures that the toothing arranged on the respective housing parts engages into the recesses of the conductor. The toothing is preferably arranged on the peripheral surfaces of the opposing stationary housing part and/or the rotatable housing part.

The toothing is preferably realized integrally with the respectively assigned housing part. The toothing and the corresponding housing part are manufactured together by means of a plastic injection-molding process such that the toothing no longer must be subsequently fixed on the respective housing parts and the connecting device can be manufactured cost-efficiently.

In order to provide a forced guidance that reliably prevents any twisting or tilting of the conductor, the recesses are preferably arranged centrally in the conductor relative to its height.

In order to compensate for tolerances, the recesses preferably consist of oblong holes that form a perforation in the conductor, into which the nub-shaped teeth engage. The recesses can be produced by means of punching, and the design of the respective nub-shaped teeth ensures that the conductor is guided such that only little wear occurs.

In order to enable the connecting device to transmit relatively high currents, several conductors may be arranged in the housing in the form of layers that lie one on top of another. These conductors are respectively guided in a forced manner by the toothing engaged with the aligned recesses and provide a relatively large conductive cross section, for example, for powering the steering wheel heater of a motor vehicle.

It should be understood that the above-described characteristics, as well as the characteristics yet to be disclosed, are not only suitable for use in the respectively described combination, but also in different combinations. The scope of the present invention is defined by the claims only.

BRIEF DESCRIPTION OF THE SEVERAL VIEWS OF THE DRAWINGS

One embodiment of the invention is described in greater detail below with reference to the drawings. Shown are.

DETAILED DESCRIPTION OF THE INVENTION

Figure 1:
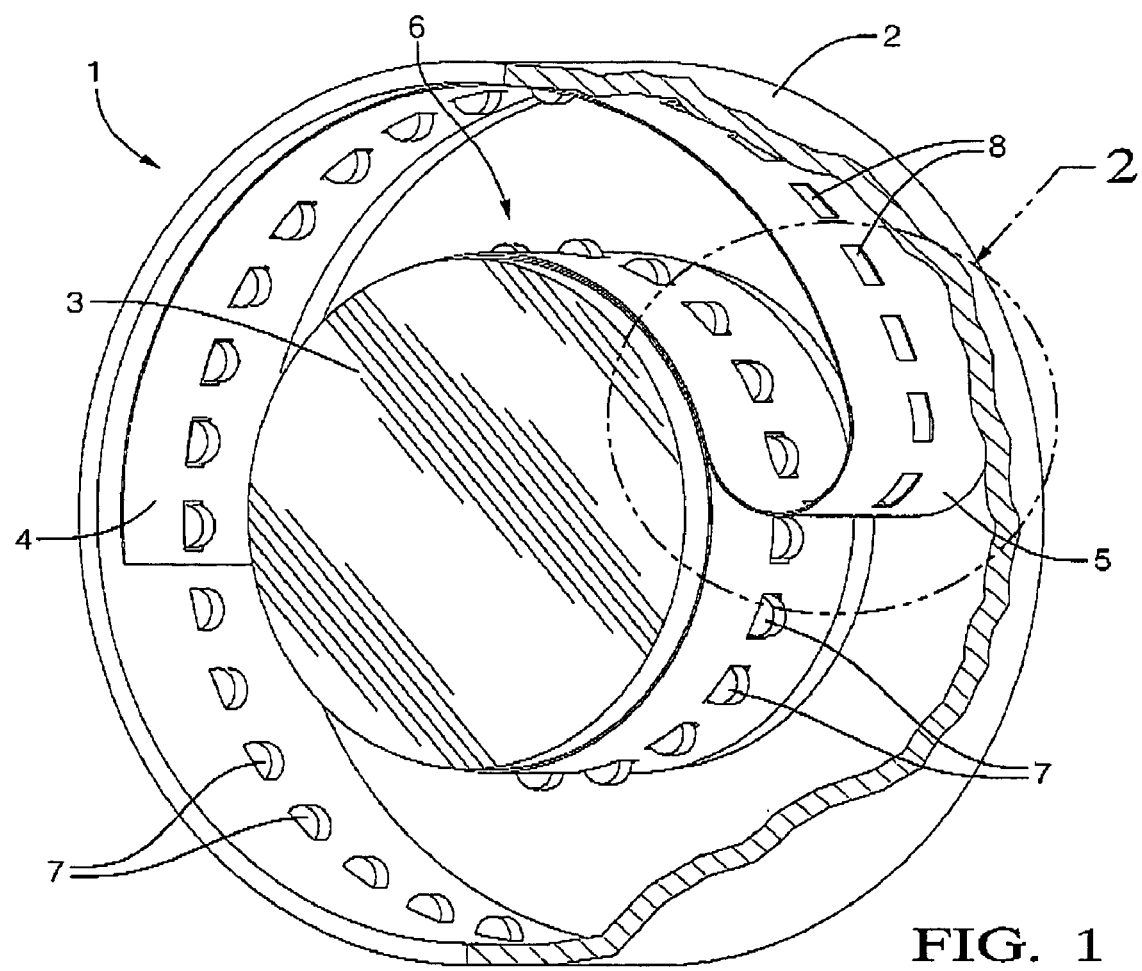
FIG. 1, a perspective representation of an electric connecting device according to the invention.

The electric connecting device comprises a housing 1 that essentially consists of a housing part 2 fixed in a (not-shown) steering column switch module and a housing part 3 that is rotatable relative to the aforementioned housing part and connected to a (not-shown) steering wheel. In this case, the steering column switch module with the housing part 2 fixed therein is arranged on the outer tube of a steering column. An electric conductor 4 is spirally wound up within the housing 1, wherein the electric conductor is of such length that the steering wheel can be turned by approximately three to four revolutions. The conductor 4 is guided within the housing 1 in the form of a reverse-direction loop 5 such that the conductor 4 can be realized with a relatively short length. A connecting unit for respectively contacting the conductor 4 with the on-board network via the steering column switch module and with a plug on the steering wheel is arranged outside the housing 1 on the end of the conductor 4 assigned to the rotatable housing part 3, as well as on the end of the conductor assigned to the stationary housing part 2.

Figure 2:
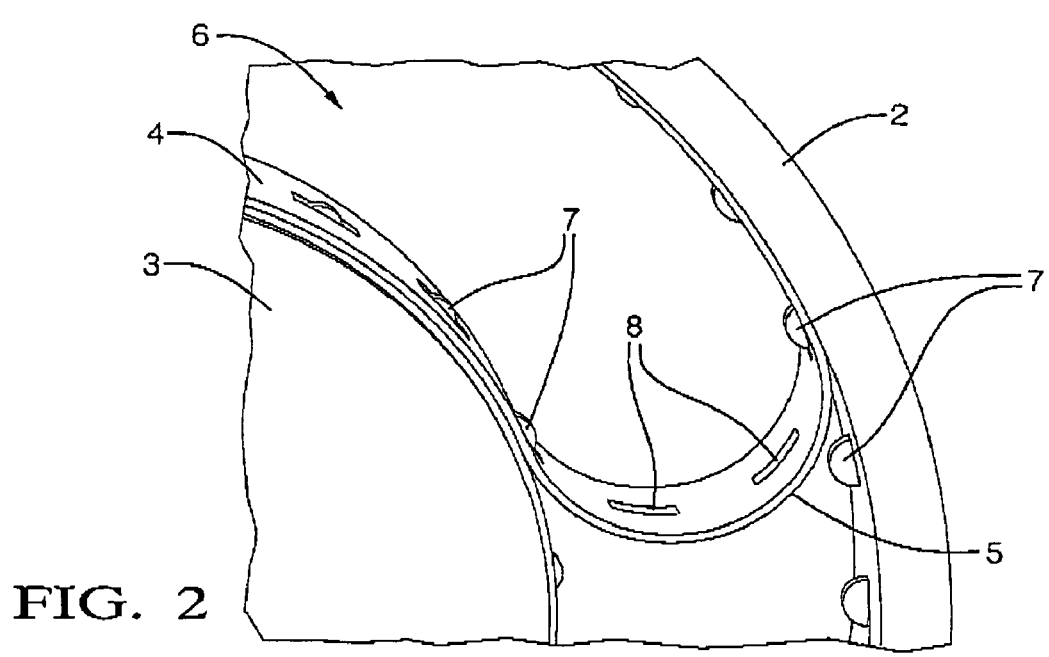
FIG. 2, an enlarged representation of the detail II according to FIG. 1.

A forced guidance 6 peripherally engages on the conductor 4 in order to ensure that the conductor 4 is wound and unwound in controlled fashion when the steering wheel is turned. The forced guidance 6 shown in FIGS. 1 and 2 comprises a nub-shaped toothing 7 assigned to the stationary housing part 2 and a corresponding toothing assigned to the rotatable housing part 3, wherein the respective toothing engages into recesses 8 in the form of oblong holes arranged in the conductor 4. The toothing 7 is realized integrally with the respectively assigned housing part 2, 3 and located approximately in the center of the conductor 4 relative to its height. Since the conductor 4 is guided in the form of a reverse-direction loop 5 and consequently has a certain elasticity or prestress, it peripherally adjoins the stationary housing part 2 as well as the housing part 3 that is rotatable relative thereto, his ensures that the respective toothing 7 engages into the recesses in the conductor 4.

Figure 3:
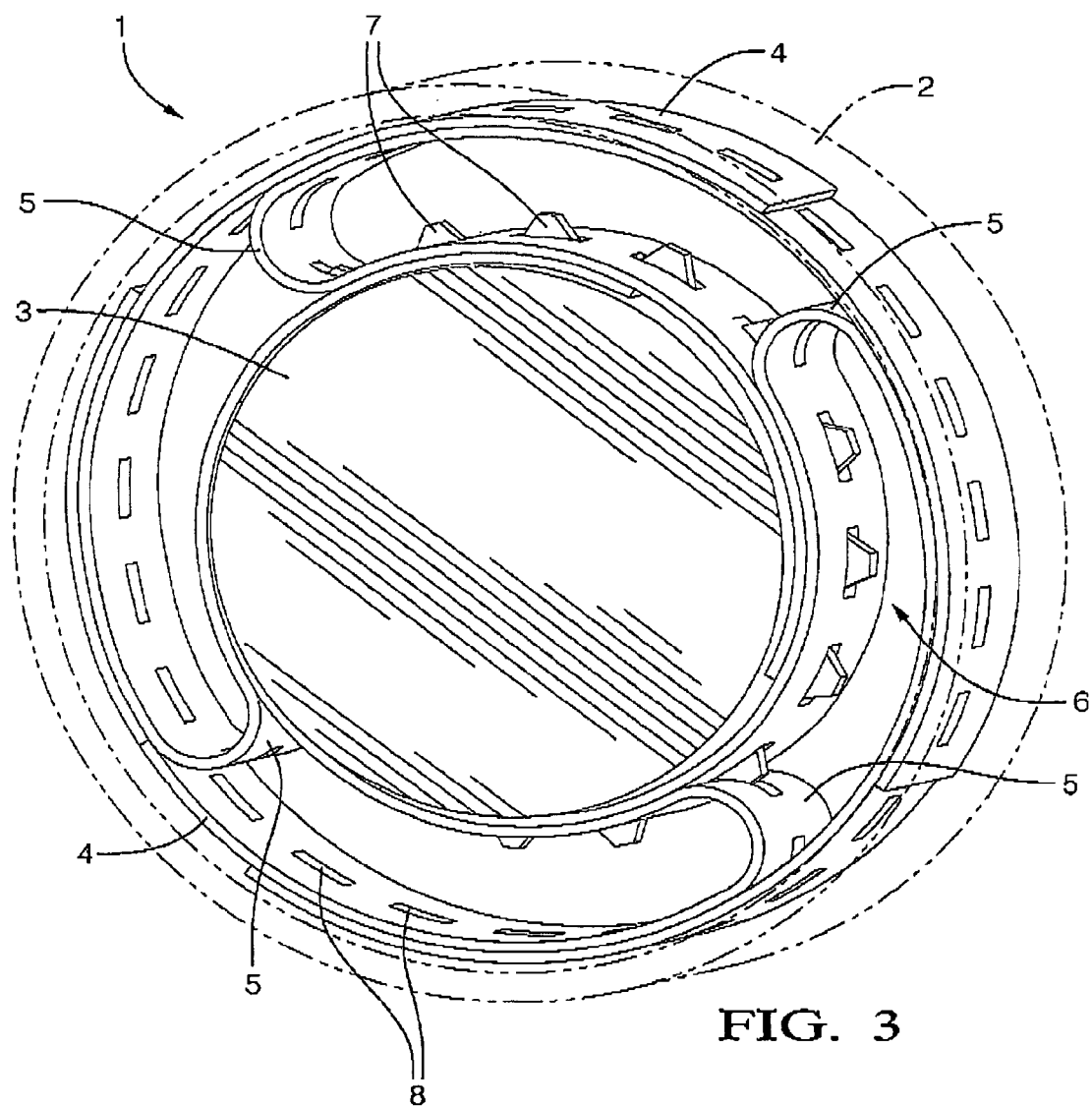
FIG. 3, a perspective representation of an alternative embodiment of the electric connecting device according to FIG. 1.

According to FIG. 3, four conductors 4 are accommodated within the housing 1, wherein each conductor is guided in the form of a reverse-direction loop 5. The loops 5 are separated at intervals. The conductor 4 is wound and unwound on/from the rotatable housing part 3 (rotor) in a controlled fashion when the steering wheel is turned, namely due to the fact that the forced guidance 6 is realized in the form of a toothing 7 that is assigned to the rotatable housing part 3 and engages into the recesses 8 in the conductor 4 that are realized in the form of oblong holes. The toothing 7 is designed in the form of a trapezoid in order to securely guide the conductors 4. The guidance of the conductors 4 on the stationary housing part 2 is ensured by the pressing force that is generated with the aid of the reverse-direction loops 5 and presses the conductors 4 against the stationary housing part 2.

The invention claimed is:

1. An electric connecting device, especially for arrangement between a steering wheel and a steering column switch module of a motor vehicle, comprising a stationary housing part and a rotatable housing part which respectively include a connecting unit and enclose at least one spiral-shaped, wound up flexible electric conductor whose respective end is connected to the connecting unit and which is guided in a reverse-direction loop inside the housing, wherein a forced guidance is assigned to the conductor in a positive fit, engaging the peripheral side of the conductor and resulting in a defined winding or unwinding of the conductor during a rotational movement of the rotational housing part; wherein the forced guidance comprises a toothing assigned to either the rotatable housing part, the stationary housing part, or both; and wherein the conductor is guided within the housing in the form of a reverse-direction loop so as to bias respective recesses in the conductor into engagement with the toothing.

2. The connecting device according to claim 1, wherein the toothing is assigned to the rotatable housing part.

3. The connecting device according to claim 1, wherein the toothing is assigned to the stationary housing part.

4. The connecting device according to claim 1, wherein the toothing is respectively arranged on the peripheral surfaces of the opposing stationary housing part and the rotatable housing part.

5. The connecting device according to claim 1, wherein the toothing is realized integrally with the respectively assigned housing part.

6. The connecting device according to claim 1, wherein the recesses are approximately arranged centrally in the conductor relative to its height.

7. The connecting device according to claim 1, wherein the recesses are realized in the form of oblong holes that form a perforation in the conductor (4), into which the respective toothing engages.

8. The connecting device according to claim 1, wherein a plurality of conductors are arranged in the housing in the form of layers that lie one on top of another.

9. The connecting device according to claim 1, wherein the forced guidance comprises a nub-shaped toothing.

10. The connecting device according to claim 1, wherein the forced guidance comprises toothing designed in the form of a trapezoid.

* * * * *